United States Patent [19]

Bond

[11] 3,995,801
[45] Dec. 7, 1976

[54] METHOD OF STORING SPARE SATELLITES IN ORBIT

[75] Inventor: Donald Spencer Bond, Princeton, N.J.

[73] Assignee: RCA Corporation, New York, N.Y.

[22] Filed: July 5, 1974

[21] Appl. No.: 486,242

[52] U.S. Cl. .............................................. 244/158
[51] Int. Cl.$^2$ ......................................... B64G 1/00
[58] Field of Search .......... 244/158, 159, 161, 172, 244/173; 343/100 ST; 325/4

[56] References Cited

UNITED STATES PATENTS

| | | | |
|---|---|---|---|
| 3,706,037 | 12/1972 | Lundgren | 343/100 ST |
| 3,747,095 | 7/1973 | Wilson | 343/100 ST |
| 3,836,969 | 9/1974 | Bond et al. | 343/100 ST |

OTHER PUBLICATIONS

Barry Miller, "Syncom 2 to Use Multiple–Access Devices", *Aviation Week and Space Tech.*, June 10, 1963, pp. 108, 109, 113, 115, 117, 121 & 123.
C. W. Lundgren, "A Satellite System for Avoiding Serial Sun–Transit Outages and Eclipses", Oct. 1970, *The Bell Sys. Tech. Journ.* pp. 1943–1972.
Martello, "Transfer from a Standby to a Stationary Orbit Using Electric Prop.", June 1972, Electric Prop. and its Space app.; Workshop 2 pp. 361–380.
Trautwein et al., "Optimum Rendezvous Guidance Study", Lockheed Missiles & Space Co., Interim Rep., June 1968.

*Primary Examiner*—Trygve M. Blix
*Assistant Examiner*—Galen L. Barefoot
*Attorney, Agent, or Firm*—E. J. Norton; H. Christoffersen; J. D. Lazar

[57] ABSTRACT

One or more satellites are stored or parked in a quasi-equatorial orbit in an inoperative or nonoperating state for subsequent operation in an equatorial plane at synchronous altitude and maintained in that plane thereafter by north-south station-keeping control systems. The satellite is launched in a slightly inclined orbit relative to the equatorial plane of the earth to limit the inclination that may be induced by perturbations for significantly long periods of time during the stored or parked mode without the need for north-south station-keeping control systems aboard the satellite for orbit adjustments.

2 Claims, 11 Drawing Figures

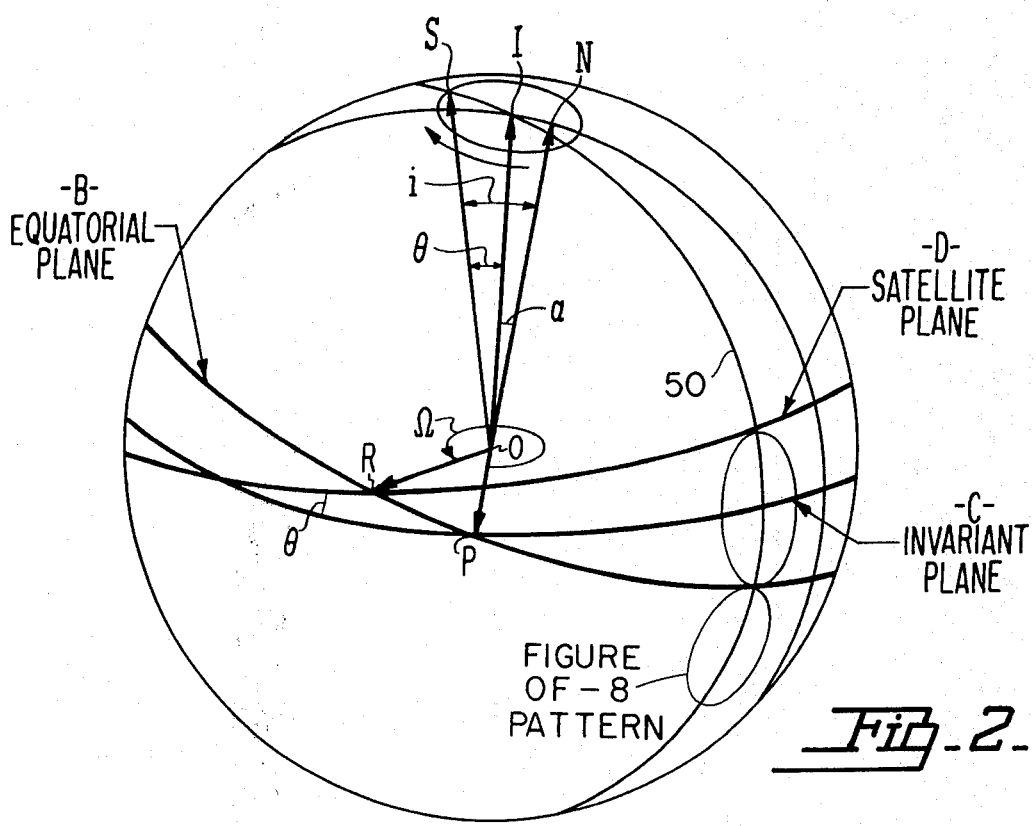
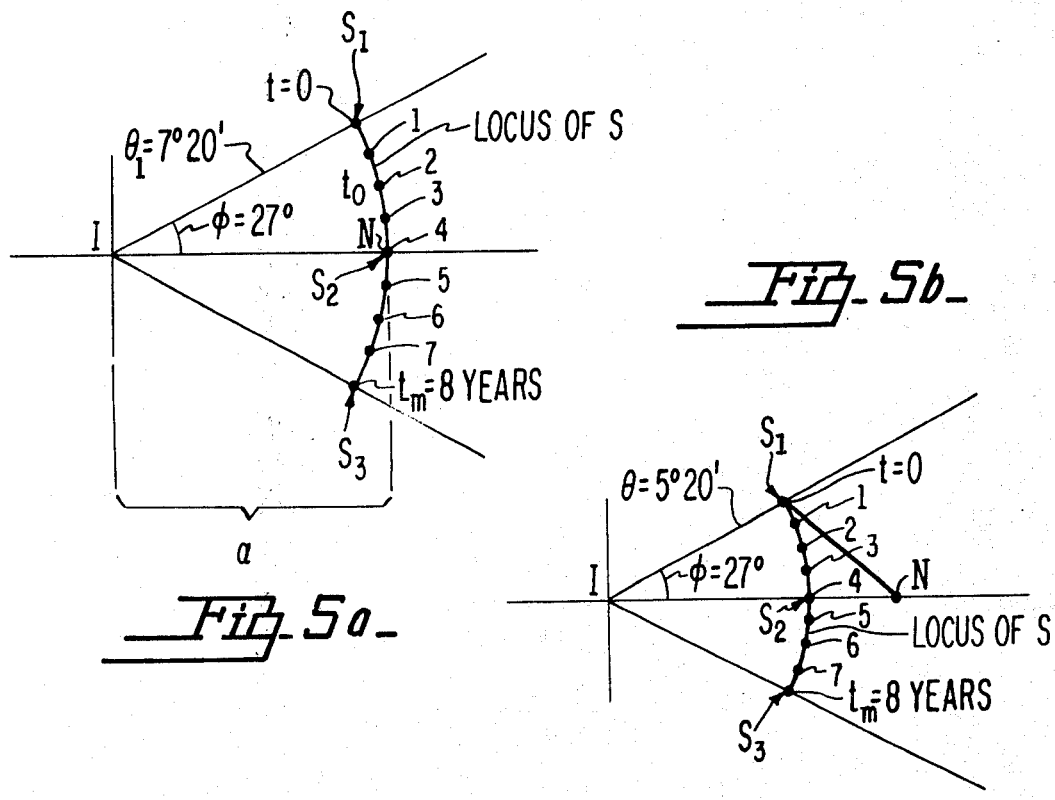

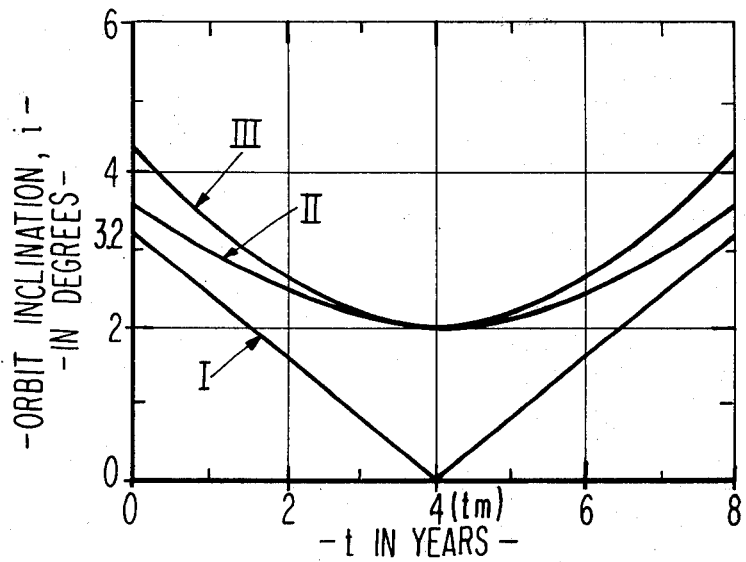
_Fig. 6a_
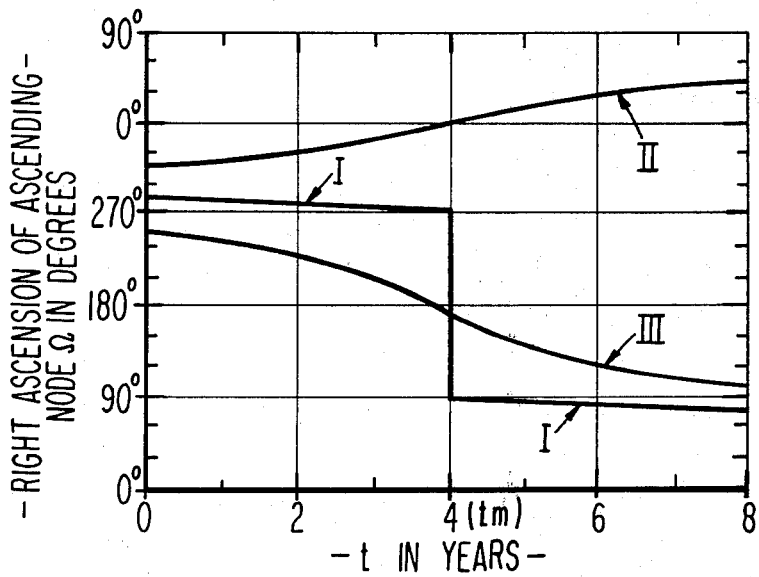
_Fig. 6b_

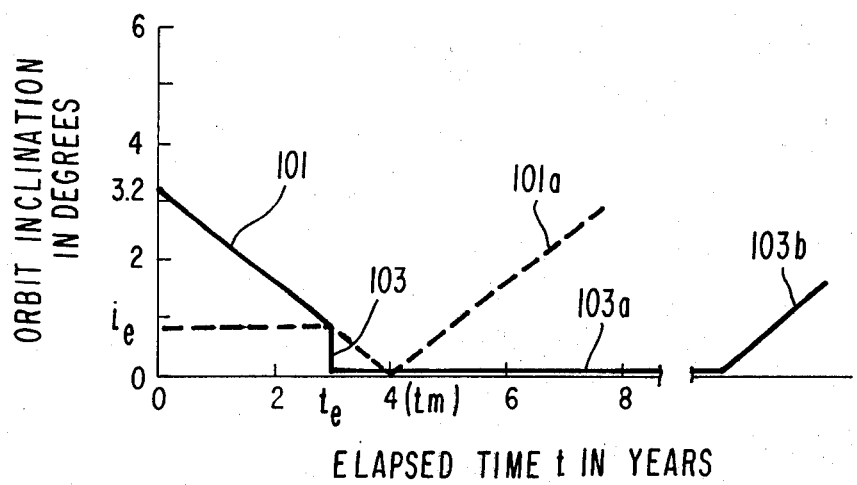
_Fig. 7_
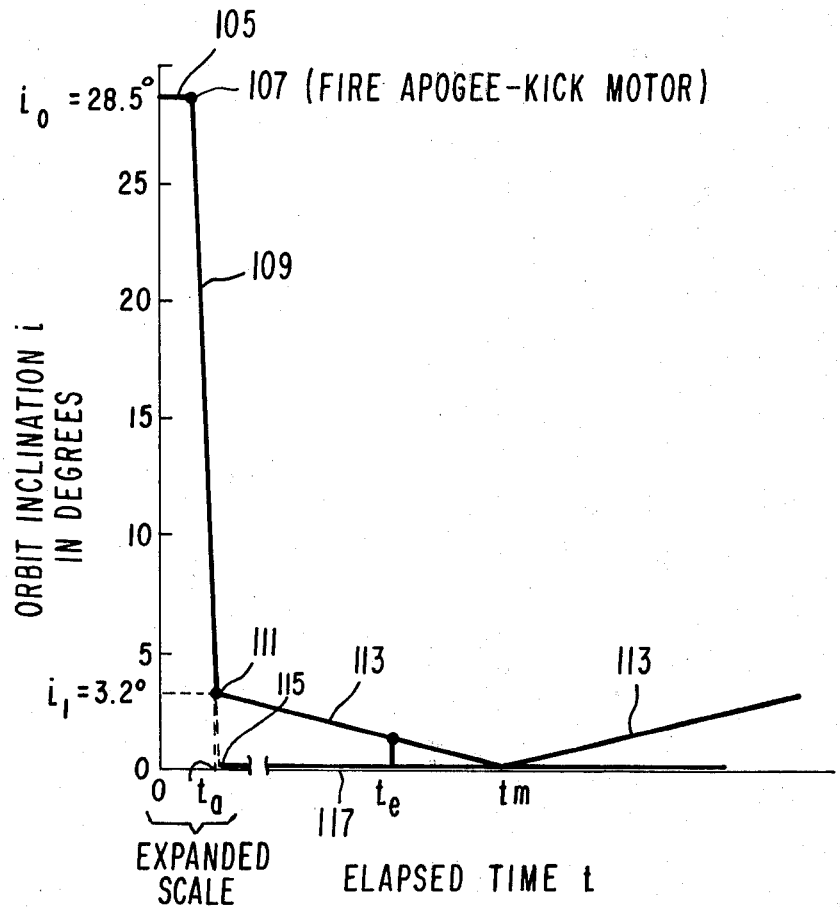
_Fig. 8_

METHOD OF STORING SPARE SATELLITES IN ORBIT

CROSS REFERENCE TO COPENDING APPLICATION

This application is related to U.S. application, Ser. No. 192,083, filed Oct. 26, 1971, based on the invention of D. S. Bond and J. M. L. Holman, entitled "Geo-Synchronous Satellites in Quasi-Equatorial Orbits" now, U.S. Pat. No. 3,836,969, issued Sept. 17, 1974.

FIELD OF THE INVENTION

This invention relates to earth satellites. More particularly, it relates to the placing of satellites in geo-synchronous orbits in readiness for communication relay purposes.

DESCRIPTION OF THE PRIOR ART

Earth satellites now in use for the relaying of telecommunications between widely separated earth stations are placed in circular equatorial orbits at an altitude such that the period of revolution is equal to the period of rotation of the earth. Thus, in principle the satellite remains at a fixed point in the sky as seen by an observer on the surface of the earth. It is thus approximately geo-stationary. It may also be said to be in a synchronous equatorial orbit.

In practice, the satellite, or spacecraft, is launched into a highly elliptical inclined orbit with apogee distance equal to the 22,300-mile altitude of the desired final synchronous orbit. Then a large rocket, or "apogee-kick motor," and a group of vernier rockets, or thrusters, inject the spacecraft into the desired circular equatorial orbit at the selected longitude.

In the present state of the space art, there is a very considerable probability of a malfunction or outright failure at some point in the launch sequence. Furthermore, such mishaps may occur in the spacecraft after it is successfully placed in its selected orbit position. Failures may include partial or complete communication cessation occurring suddenly or by gradual deterioration.

For these reasons it is customary to provide at least two operating spacecraft in orbit, one of which is the spare or "back-up" for the other, and to provide at least one more spare spacecraft stored on the ground for use in case one of the launched satellites fails.

Careful consideration will demonstrate that the currently-used plan of storing the nonoperating spacecraft on the ground is undesirable and risky under most circumstances where continuity of communication service is paramount. Instead, the nonoperating spare spacecraft should be stored in orbit.

Reverting again to the delays and uncertainties of launch, assume that either the operating spacecraft, designated F-1, or the operating spare in orbit, designated F-2, suddenly fails. A later failure of the other would then result in serious and costly loss to the system operator or his customers who depend on uninterrupted service. For example, the customer might be a commercial television network providing nationwide program distribution. Prompt launch of the ground spare satellite, F-3, is indicated. But serious delays can be caused by the necessity of pre-launch check-out and by the lack of a booster rocket, a launch pad, or a trained launch crew. Further, there is the uncertainty of the launch itself. If F-3 fails on launch, a long delay may occur until a new spacecraft is built and tested. Once F-3 is placed in orbit, these uncertainties no longer exist. Thus, in contrast to the methods heretofore employed, F-3 should be launched and put into a suitable stand-by condition in orbit to insure immediate availability. This should be done in such a way as not to sacrifice its total operating life.

SUMMARY OF THE INVENTION

According to the invention, a spare satellite is launched and placed into a quasi-equatorial synchronous orbit, the inclination of which decreases with time. The satellite in this stored or parking position is equipped to be fully operational on command at some subsequent time during a predetermined life-time of the satellite. When the satellite is to be brought into its operational condition, suitable station-keeping means such as jet-thrusters are energized to translate the satellite from its quasi-equatorial orbit to a position on the equatorial plane. Thereafter, the satellite is rendered operational by suitable ground control commands and is kept in an equatorial plane in a conventional manner by the north-south station-keeping means.

DESCRIPTION OF THE DRAWING

FIG. 2 is a diagram illustrating the precession of the satellite orbit normal.

FIGS. 5a and 5b are illustrations of the locus of the orbit normal for two respective initial conditions.

FIGS. 6a and 6b are graphs illustrating the inclination and right ascension of the ascending node during the life-time of three satellites.

FIG. 7 is a graph of orbit inclination when a spare satellite is put into operation.

FIG. 8 is a graph of orbit inclination for the initial launch phase.

DETAILED DESCRIPTION OF PREFERRED EMBODIMENTS

According to the invention, a satellite is placed in a parking position in orbit in a manner such that its position is substantially maintained in a near or quasi-equatorial orbit without the need of onboard or ground control operation. The satellite is otherwise ready for operation upon suitable command from ground control when it is desired to be rendered operative. The conventional modes of operating satellites in orbit require north-south as well as east-west station-keeping means to maintain the desired orbit of the satellite. Such continuous demands for maintaining the satellite in orbit are so costly in terms of fuel requirements and other energy dissipating means, that the use of a satellite in a parking orbit for spare satellites purposes is not done using such conventional station-keeping means. Instead satellites are stored on the ground ready for launch in the event of the need for such a satellite to replace another satellite in orbit that is rendered inoperative for one reason or another. A method for launching and placing a satellite into a quasi-equatorial orbit that will satisfy the requirements of being able to be parked or stored without further attention by on-board or on-ground means, according to the present invention, is described in the above-identified copending application. In brief, the teachings of that copending application include the method of launching the satellite into the desired parking orbit.

Only so much of that disclosure that is needed to understand the present invention, will be referred to herein.

Figure 1:
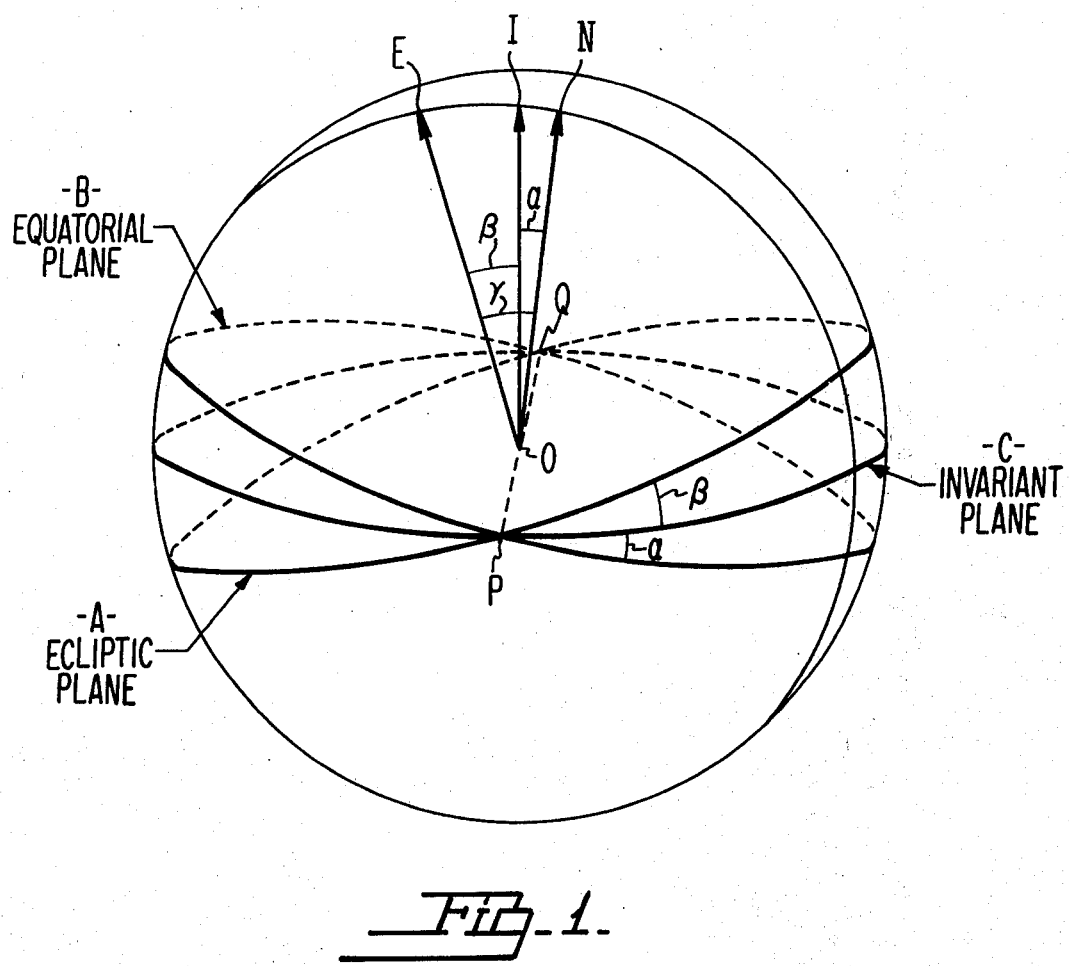
FIG. 1 is a diagram illustrating the several planes concerning the geo-stationary orbit.

Referring to FIG. 1, there is shown the planes defining the orbits of a satellite of interest to the present invention.

An extended analysis of the perturbations of orbits of earth satellites has been described by R. H. Frick, in a report published by the Rand Corporation, Santa Monica, Calif., entitled "Orbital Regression of Synchronous Satellites Due to the Combined Gravitational Effects of the Sun, the Moon, and the Oblate Earth." (Report R-454-NASA, Aug. 1967).

Referring now to FIG. 1, the ecliptic plane, designated A, has a normal (perpendicular line) OE. The equatorial plane, as designated B, has a normal ON which is directed to and through the north pole of the earth. The invariant plane is designated C and has a normal OI. The three vectors OE, ON, and OI lie in the same plane, and this plane is perpendicular to the line of nodes PQ at the center of the earth O. According to the analysis of the phenomenon as described by Frick, the angle $\beta$ between the ecliptic and the invariant planes is 16°7' at synchronous altitude, so that the angle $\alpha$ between the earth's axis and the normal to the invariant plane is 7°20'.

If a satellite is in a circular orbit whose plane D is not coincident with C, as shown in FIG. 2, the normal to the satellite orbit lies along OS. Then during an interval of a number of years the vector OS traces out a cone whose axis is OI and whose apex half-angle is $\theta$. The angle $\theta$ is constant except for small-amplitude periodic terms. The ascending node of the satellite orbit is at R when referred to the equatorial plane. The line of nodes thus moves in a retrograde direction along plane B. The period of the precessional motion of OS is about 53 years for orbits nearly equatorial. The actual period in years is:

$$t = 52.84 \sec \theta \quad (1)$$

For an orbit that is equatorial at one time in its history, $T = 53.249$ years.

Secular Changes in the Satellite Orbit

Figure 3:
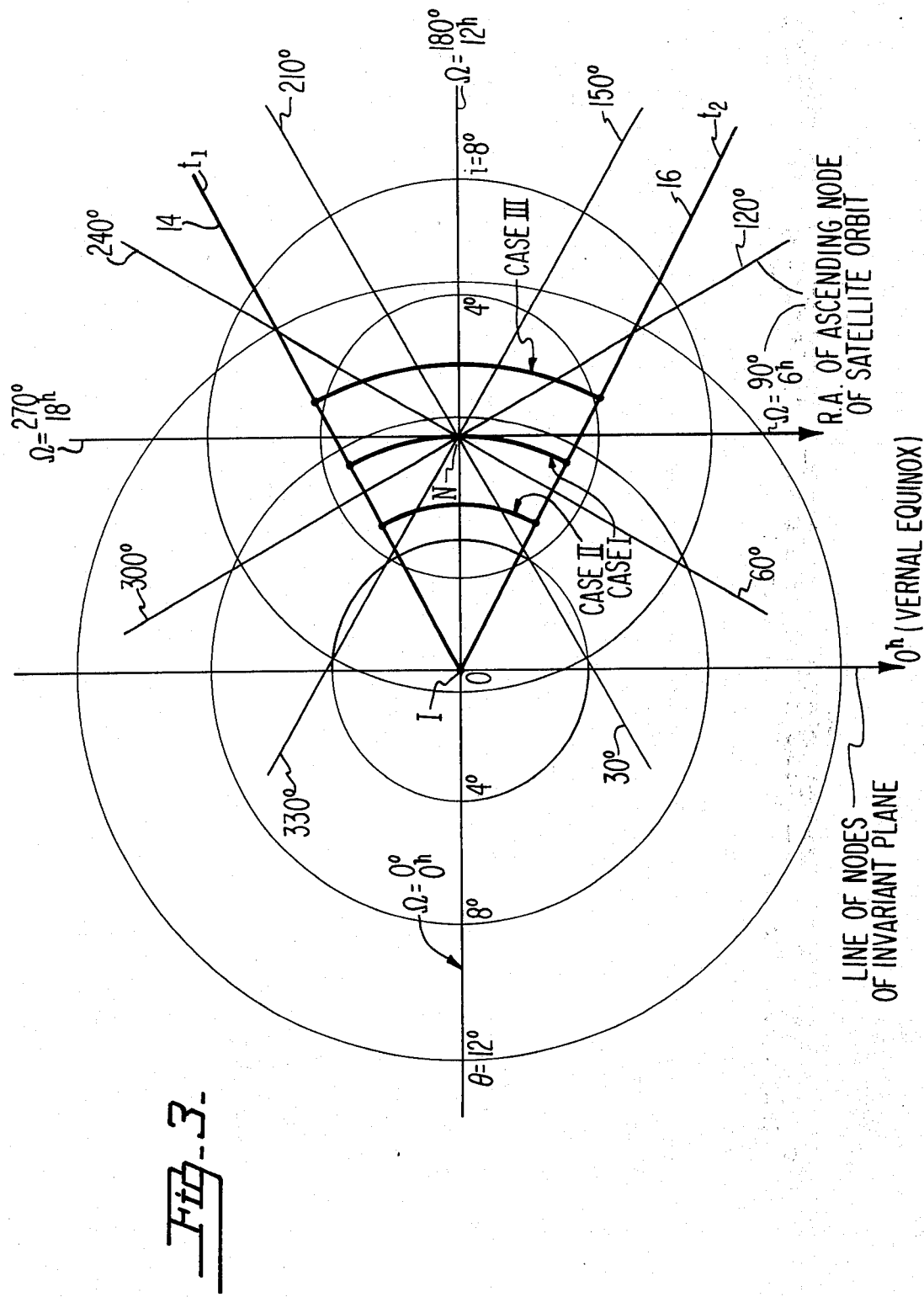
FIG. 3 is a diagram in gnomonic projection of FIG. 2 indicating the relationship of the locus of the satellite orbit normal to the inclination and right ascension coordinates.
Figure 4:
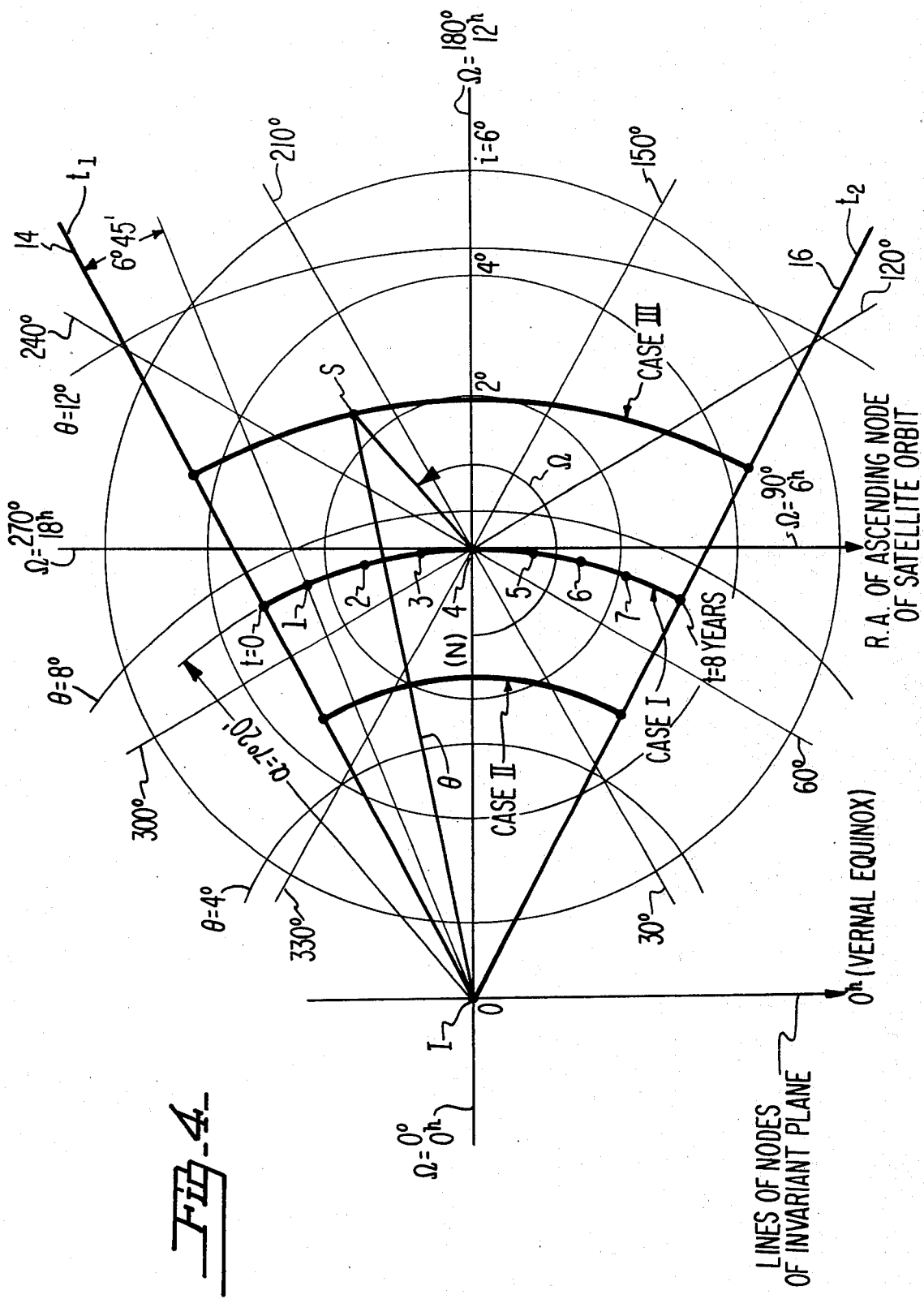
FIG. 4 is an enlarged view of a portion of FIG. 3.

The description of these phenomena can be somewhat simplified by projecting the celestial sphere of FIG. 2 onto a plane tangent at I. In this type of projection, known as a gnomonic projection and as shown in FIGS. 3 and 4, the trace of point S is a circle with center I. The north pole of the earth is shown at N and is displaced 7°20' from I. At any time t the polar coordinates of point S represent uniquely a satellite orbit of inclination $i$ (referred to the equatorial plane and measured by the length NS) and of right ascension of the ascending node $\Omega$. Then point S moves clockwise in a circle with center at I and radius $\theta$ (where $\theta$ is measured by the length OS) with uniform speed and with period T. Epochs $t_1$ and $t_2$ in the period T are represented by radial lines (shown as reference lines 14 and 16 respectively) from I. The interval of 1 year corresponds to an angle of approximately 6°45' at I.

With this portrayal of the behavior of the orbit of a quasi-equatorial synchronous satellite subject to the perturbations due to the sun, the moon, and the oblate earth, there will now be described the procedure according to the invention for selecting the orbit into which the satellite must be launched.

An example will illustrate the selection. Assume it is desired to establish a satellite in synchronous orbit and to limit the inclination to $i_{max}$ throughout a life-time $t_m = 8$ years. FIG. 5a shows the locus of S as a function of time. At $t = 4$ years, S lies at N, and the orbit is truly equatorial. The angle $S_1IN$ is designated $\phi$. At $t = 0$, $$i_{max} = \arc \cos (\cos^2\alpha + \sin^2\alpha \cos \phi) = 3.1° \quad (2)$$

since $\alpha = 7.33°$ and $\phi = 27°$. During the 8-year life the inclination will vary as shown as Case I in FIG. 6a. The average rate of change is 0.78° per year. The right ascension of the ascending node $\Omega$ is plotted in FIG. 6b.

In another case, as shown in FIG. 5b, initial conditions can be chosen to diminish somewhat the change in magnitude of the inclination over the same life-time. In this case point N lies outside the locus of S. The variations of $i$ and $\Omega$ with time are shown as Case II of FIG. 6a and b. Here the inclination changes only 0.38° per year. If the locus S encloses point N, the typical values are shown as Case III of FIG. 6a and b. For various embodiments of the invention, it may be preferable to select different initial conditions within the classes of cases shown in the examples, as will become clearer in view of the discussion which follows.

In general, the preferred initial conditions include an orbit inclination of 7°20' or less and a right ascension of the ascending node between 180° and 360°. In other words, the point S representing the satellite orbit normal should lie in the upper half of the plane of FIGS. 3 and 4 and within a circle of radius IN with center at N.

Selection of Launch Conditions

A typical launch of a synchronous equatorial satellite from Cape Canaveral begins with injection into a low inclination elliptical transfer obit near the first equator crossing (descending node). The apogee of the transfer orbit is at or near synchronous altitude (22,300 statute miles), and the orbit is circularized and its inclination reduced to zero at the first, second, or subsequent apogee passage (close to the ascending node), depending on the desired geographic station. The phasing orbit achieved by the apogee-kick motor is designed to have a period slightly more or less than one sidereal day according to whether the desired station longitude is west or east of the injection apogee longitude. After the requisite number of phasing orbits, during which the satellite drifts to its desired location, the orbit period is adjusted by the on-board propulsion to precisely one side real day. According to the present invention this sequence is modified only by the reduction of the inclination to a selected small value, but, it is to be noted, not zero.

For a specified station longitude in orbit the injection sequence described here leads to a fixed time interval $t_{oi}$ from take-off to injection into the final synchronous orbit over the desired station. By a suitable choice of launch time one can, in addition, achieve any desired right ascension of the ascending node. The right ascension of the node is, of course, chosen to provide a small variation in orbit inclination over the life of the satellite as described above under the section entitled "Secular Changes in the Satellite Orbit" i.e., in the range 180° to 360°.

The launch time to yield a specified right ascension of the ascending node $\Omega$ may be determined in the following manner. If injection into the synchronous orbit of inclination $i$ takes place at longitude $\lambda_I$ and latitude $\phi_I$ then the longitude of the ascending node of the orbits at the time of injection is:

$$\lambda_N = \lambda_I - \arcsin(\tan\phi_I/\tan i) \qquad (3)$$

The right ascension of the ascending node is given by:

$$\Omega = \alpha_{GI} + \lambda_N \qquad (4)$$

where $\alpha_{GI}$ is the Greenwich hour angle at the time of injection.

The right ascension of Greenwich at midnight on a specified date is given to sufficient accuracy for these purposes by:

$$\alpha_{GM} = (100.152 + 360(T-[T]) + 0.007694T) \bmod 360 \qquad (5)$$

where $T = (JD - 2436935)/365.25$; $JD$ = Julian date; and $[T]$ = integral part of $T$.

The time from midnight to injection is then given by:

$$t_{MI} = \alpha_{GI} - \alpha_{GM} / \omega_E \qquad (6)$$

where $\omega_E$ is the rate of rotation of the earth. Finally the launch time occurs a time $T_{OI}$ earlier than injection so that the launch must occur at time:

$$t_O = t_{MI} - t_{OI} \qquad (7)$$

past midnight on the day of launch.

Referring now to FIG. 7, which is a graph of the orbit inclination when a spare satellite, according to the invention, is to be put into operation. Lines 101 and 101a corresponding to case I of FIG. 6a, illustrate the variation of inclination of the satellite orbit in a nonoperating condition. If such a spare satellite is required suddenly at time $t_c$, suitable thrusters on the satellite are actuated to bring the inclination to zero and to maintain this zero inclination by further operation as required by the thrusters during the remainder of the operational life of the satellite, or until the thruster fuel is exhausted. The process of activating the spare satellite is illustrated in FIG. 7 in the sequence of events portrayed by lines 103, 103a, and 103b. It will be understood, upon exhaustion of the thruster fuel, the north-south station-keeping ability of the system is lost and the inclination of the orbit will increase so that the satellite is no longer in the equatorial plane.

FIG. 8 delineates the orbit inclination of a satellite launched in accordance with the method of the present invention and contrasts thereby the procedure of achieving an orbit inclination of zero degrees as is practiced in conventional systems.

If the launch site is at Cape Canaveral in Florida, the initial angle $i_0$ = 28.5 degrees as shown by line 105 for the time the satellite is in an elliptical transfer orbit. At point 107, the apogee-kick motor (AKM) is fired and the eccentricity and inclination decrease rapidly as depicted by line 109. At inclination $i_1$, shown as 3.2° at point 111, the apogee motor operation is caused to cease, according to the invention, and the inclination decreases very gradually (at about 0.8 degrees per year) along line 113 corresponding to line 101 of FIG. 7 and the initial phase, also, of case I of FIG. 6a. It should be noted that there is a change of scale of the abscissa in FIG. 8 to the right of the time scale at point 111.

It should be appreciated and understood that in accordance with the prior art convention, an apogee-kick motor required to reduce the inclination $i$ to zero, at point 115 would have to have a greater capability than an AKM of the size that would satisfy the requirements of transferring a spare satellite into operating position along paths 109 and 113 as compared to the prior art transfer requirements of path 109 to 117 following the transfer or reduction of the inclination to zero, additional hydrazine for operating the station-keeping thrusters would be expended periodically to maintain the zero orbit inclination along line 117.

It will be understood that while the sequence of inclination adjustments, according to the present preferred method of the invention, utilizes conventional chemical (hydrazine) propulsion with apogee injection into the orbit, other means have also been considered by those skilled in this art. Such other means include, for example, ion engines and nuclear reactor thrusters. All of these means for altering the inclination of the orbit of a satellite are similar in that energy must be expended to effect the altered orbit inclination, and this energy requires mass in the spacecraft for propellant or physical structure. According to the present invention, it will be appreciated, a saving in propellant fuel (or other form of energy is effected. An example will illustrate such a saving. For an orbit inclination $i_0$ at launch of 28.5°, the expenditure of fuel to reduce the inclination to an angle $i$ is proportional approximately to $i_0 - i$. While the specific impulse of the solid propellant usually employed in the AKM is somewhat higher than that of the hydrazine usually employed in vernier thrusters, other factors must be considered so as to make the difference of no significance for the purposes of the present illustration.

Figure 9:
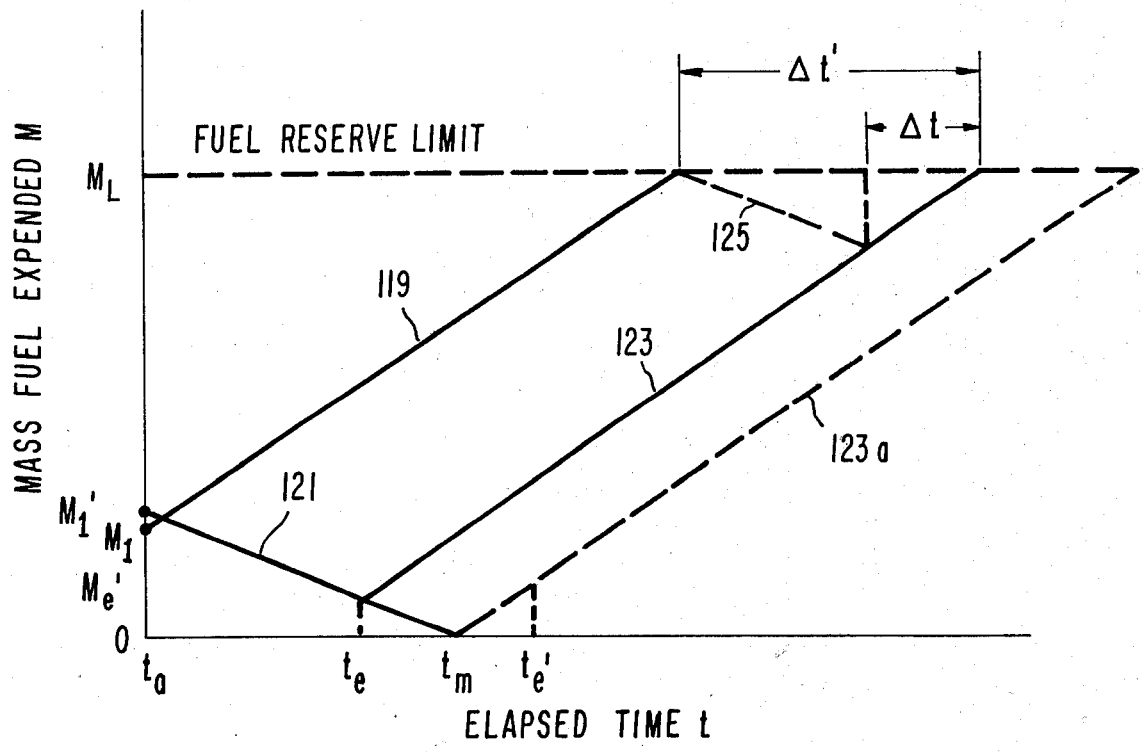
FIG. 9 is a graph showing the expenditure of propellant fuel during the life of a satellite in orbit.

The relative fuel expenditures for the two contrasting modes of operation is illustrated in FIG. 9. According to the graph plotted in FIG. 9, the initial condition is assumed to be $i = i_1$, at time $t = t_a$, corresponding to point 111 in FIG. 8. The expended mass M is plotted as a function of time in orbit. Curve 119 applies to the conventional mode of operation heretofore. A mass $M_1$ must be expended to decrease the inclination angle $i$ to zero (i.e. from point 111 to 115 in FIG. 8) at the beginning of its operational mission, after which the expended mass M increases steadily according to curve 119. Thus the fuel reserve is steadily depleted by such expenditure.

In contrast, according to the present invention, the mass of fuel to reduce the inclination $i$ to zero (i.e. from point 111 along path 113 in FIG. 8) at any arbitrary time $t_e$ is shown by the curve 121, 123a. Thus, if $t_e$ occurs immediately after the satellite is placed in a quasi-equatorial orbit, mass $M_1'$ must be expended. As discussed above, $M_1'$ is very nearly equal to $M_1$. When the inclination reaches zero at the time $t_m$, no fuel will be needed to reduce the orbit inclination to zero. Further, after time $t_m$, the inclination of the orbit of the satellite, according to the present invention, increases as depicted by the curve of case I shown in FIG. 6a to the right of the time 4 years ($t_m$). If at time $t_e'$, it is desired to place the satellite into operation, a command will be given to activate the orbit adjust thrusters to reduce the orbit inclination back to zero. The amount of fuel that must be expended to reduce the inclination to zero is $M_e'$ as shown in FIG. 9. The amount of fuel that thereafter must be expended to keep the satellite in the equatorial plane is represented by the curve 123a to the right of time $t_e'$ (FIG. 9).

Thus, it will be clear from FIG. 9, that given the total fuel reserve $M_t$, for both the conventional method of inclination adjustment and the method of the present invention, a satellite in accordance with the method of the present invention will have an operating life in the equatorial orbit that is longer by an amount $\Delta_t$ than the conventional procedure discussed above. Further, this difference will increase until $t = t_m$, the arbitrarily selected time at which the spare satellite in orbit is designed or expected to be placed into active, operational service. It will be further evident, in FIG. 9, that the life of a satellite before depletion of fuel reserves measured from the beginning of storage in orbit, is greater by a larger amount ($\Delta_t'$) in accordance with the method of the present invention. This is represented in FIG. 9 by the parallel relationship of line 125 and line 121. The most significant if not the greatest improvement in orbital life of a satellite in accordance with the present invention, occurs at or some time after $t_m$, e.g., $t_e'$, where the dotted line 123a represents such a fuel expenditure as described above.

While the invention has been described by means of an embodiment wherein an earth-synchronous equatorial satellite is used, for example, in telecommunication relay purposes, it should be understood that satellites for other applications may make use of the invention. Such other applications include meterological, earth-resources, navigation, military observation, astronomical and other satellite types that will be apparent by those skilled in the art.

A satellite placed in orbit in accordance with the present invention may be tested periodically to determine its status of operability, but is otherwise maintained in a nonoperating condition, in an orbit which is changing slowly in inclination due to the gravitational perturbations, discussed above. The satellite, according to the invention, to serve as an in-orbit spare, is launched into a quasi-equatorial orbit into an inclination and right ascension as described in detail above.

When the satellite is to be placed in operation, propellant fuel or other orbit adjusting energy is expended to adjust the orbit to coincide with the equatorial plane. The satellite is then ready for use and is placed into such use by suitable commands from a ground station.

What is claimed is:
1. A method of operating a satellite system including at least one operating satellite in geo-stationary orbit, and at least one spare satellite, said spare satellite being stored in orbit for subsequent use on command and having means responsive to suitable commands for altering its orbit by thrust propulsion means which include north-south station-keeping means, comprising the steps of:
   a. launching a spare satellite into an inclined progressively changing orbit at a substantially synchronous altitude such that $\Omega$ is selected to minimize the maximum inclination of the orbit throughout a predetermined time period defining the storage life of the satellite, wherein $\Omega$ is the right ascension of the ascending node,
   b. selecting the inclination of said spare satellite to be initially 7°20' or less in accordance with said predetermined time period,
   c. selecting the right ascension of the ascending node $\Omega$ to be between 180° and 360° whereby, during said predetermined time period, the orbit inclination remains bounded without ever operating said north-south station-keeping means while stored in orbit prior to said subsequent use on command,
   d. testing periodically the operability of said spare satellite but otherwise maintaining a nonoperating condition of said spare satellite in said orbit, and
   e. in the event said operating satellite fails to operate, altering on command by the use of said thrust propulsion means the orbit inclination of said spare satellite to substantially zero whereby said spare satellite is moved from its stored orbit to a geo-stationary orbit for operational use in said geo-stationary orbit.
2. A method according to claim 1 further including the steps of maintaining said spare satellite in operating condition in said geo-stationary orbit by north-south station-keeping means.

* * * * *